Figure 1:
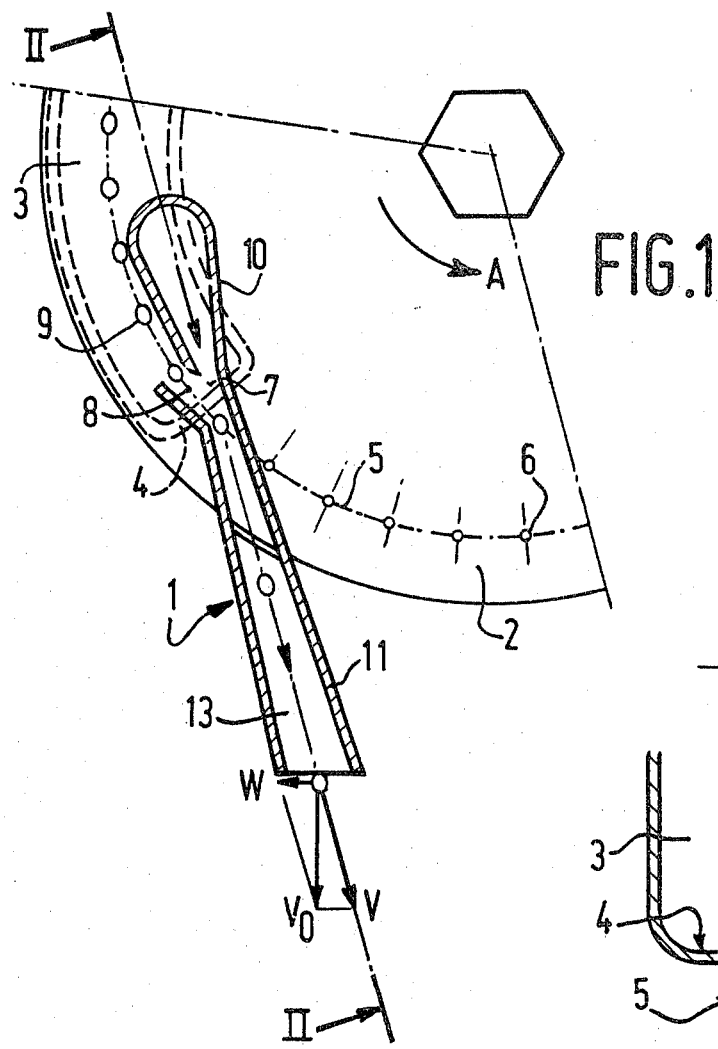

United States Patent [19]

Maury

[11] 4,399,757

[45] Aug. 23, 1983

[54] SEEDING MACHINE WITH A PNEUMATIC SEED EJECTING MEANS, ESPECIALLY FOR VEGETABLE CULTURE

[75] Inventor: Jean-Pierre Maury, Montereau, France

[73] Assignee: Nodet - Gougis, Montereau, France

[21] Appl. No.: 249,969

[22] Filed: Apr. 1, 1981

[30] Foreign Application Priority Data

Apr. 4, 1980 [FR] France ............................. 80 07775

[51] Int. Cl.³ .......................... A01C 7/04; A01C 7/20
[52] U.S. Cl. ........................................ 111/34; 111/73;
111/77; 111/80; 221/211; 406/63; 406/68;
406/144
[58] Field of Search ................. 221/211, 278; 111/77,
111/34; 406/68, 62, 63, 144

[56] References Cited

U.S. PATENT DOCUMENTS

| 1,331,235 | 2/1920 | Bristow | 221/211 |
| 1,789,692 | 1/1931 | Rosencrants | 406/68 |
| 3,387,746 | 6/1968 | Whipple | 221/211 |
| 3,868,148 | 2/1975 | Schultz | 221/278 X |

FOREIGN PATENT DOCUMENTS

| 429529 | 11/1924 | Fed. Rep. of Germany. | |
| 1208202 | 2/1960 | France. | |
| 1378012 | 10/1964 | France. | |
| 1410390 | 8/1965 | France. | |
| 1585445 | 1/1970 | France. | |
| 2305114 | 10/1976 | France | 221/211 |
| 2323308 | 4/1977 | France | 111/77 |
| 802899 | 10/1958 | United Kingdom | 221/211 |
| 254240 | 1/1970 | U.S.S.R. | 111/34 |

Primary Examiner—Steven A. Bratlie
Attorney, Agent, or Firm—Frost & Jacobs

[57] ABSTRACT

The present invention relates to a seeding machine of the pneumatic ejection type. The seeding machine includes an apertured distributor disk 2 which rotates past a suction chamber 3 terminating in an end wall 4, and an ejector venturi 1 is juxtaposed to the side of disk 2 opposite to chamber 3, neck 7 of said venturi being located in line with the end of said chamber and having an inlet port 8 which straddles the path of travel 5 of the suction apertures in disk 2. The machine has an application to the sowing of light seeds such as vegetable seeds.

8 Claims, 5 Drawing Figures

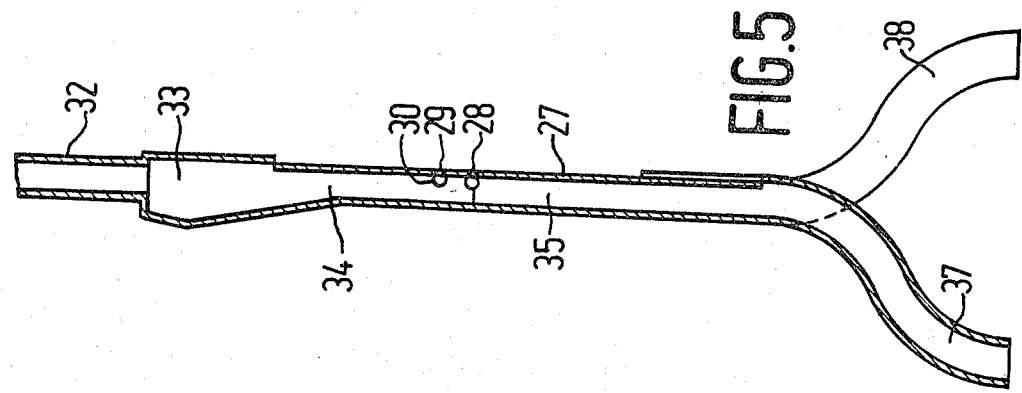
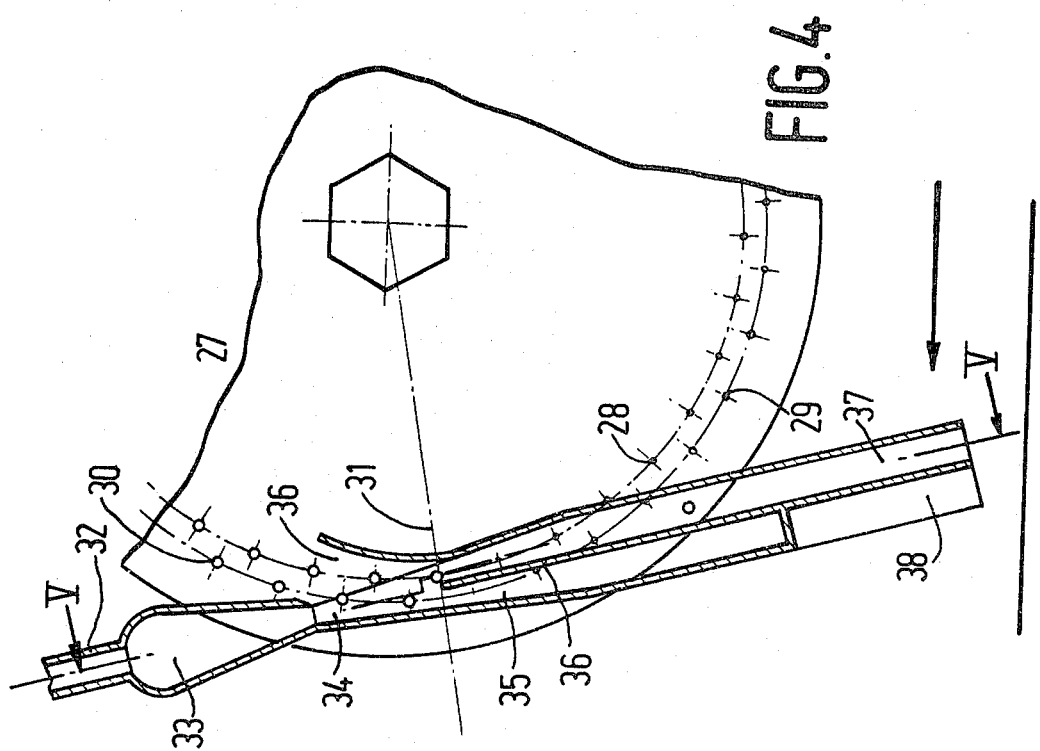

SEEDING MACHINE WITH A PNEUMATIC SEED EJECTING MEANS, ESPECIALLY FOR VEGETABLE CULTURE

FIELD OF THE INVENTION

The present invention relates to a seeding machine equipped with a pneumatic seed ejecting means.

BACKGROUND OF THE INVENTION

The invention is more particularly applicable to a seeding machine intended to sow light seeds, such as especially a vegetable seeding machine.

It is already known, in particular from U.S. Pat. No. 1,331,235, to pneumatically eject the seeds from the seeding machine distributor. This U.S. patent discloses a pneumatic seeding machine equipped with a distributor of the apertured disk type wherein the seed ejector system includes a blow-tube opening behind the seed transport apertures and a funnel provided with a guide duct disposed in front of said apertures and on the side of the disk opposite to the blow-tube. Since the size of the apertures in the distributor disk is adapted to the size of the seed to be sown, this known pneumatic ejector device have drawbacks in the case where it is intended to sow seeds of small size such as vegetable seeds. In fact, due to the small size of the distributor disk apertures, the air blown through the latter and carrying the seed onto the ground lacks strength and is unable to eject the seeds with sufficient force for, among others, rendering them insensitive to wind action.

Another type of pneumatic ejector is disclosed in French Pat. No. 1,378,012 which shows a mechanical distributor provided with sockets and cooperating with a pinion, the pinion teeth pushing the seeds out from said sockets. The pneumatic ejector disclosed in this patent mainly consists of a cylindrical tube fed at one end with compressed air and provided laterally with an inlet window formed under the sockets wherein the pinion teeth come to project. On this distributor, the seeds are pushed by the pinion teeth into the ejection tube and expelled towards the ground by the air flowing through said tube. Since the air pressure within the tube is higher than atmospheric pressure, a flow of leakage air escapes via the window through which the seeds are fed, so that this device is suitable only on distributors provided with members adapted to push the seeds into the tube, or else for distributing seeds sufficiently heavy for not being carried away by the leakage air-flow. However, such a pneumatic ejector is unsuitable for pneumatic distributors of the apertured disk type intended for sowing light seeds, since such seeds would be pushed back by the leakage air-flow crossing the window and would never work their way into the ejection tube.

German Pat. No. 429,529 describes the combination of a seed distributing device of the rotary drum type, of a venturi and of means for releasing the seeds at a distance from the venturi neck. A rotary drum carries mechanical seed-releasing device moving past a channel which opens at a venturi neck. The seeds are fed to the end of a suction channel and are then released. Since a compressed fluid flows through the converging and diverging sections of the venturi, a suction effect occurs in the lateral channel, so that the seeds which were released at a zero velocity at the outer end of the suction channel are gradually sucked in and accelerated up to the venturi neck. This system has several drawbacks. Firstly, the seeds are released far from the venturi neck. Thus, the suction created by the venturi has to be transmitted far from the latter, and so requires a good tightness between the venturi and the rotary cylindrical drum. Said tightness is difficult to obtain, since it should exist along a cylindrical surface. Secondly, the seed transport is not very efficient since the carrying force created by the suction flow is relatively weak. It should moreover be noted that, when the seeds are released, they have no velocity in the suction direction and would even rather have a velocity component of opposite direction. All of these factors jointly result in bad reliability of the system described in this patent.

OBJECTS AND SUMMARY OF THE INVENTION

The present invention therefore relates to a seeding machine of the pneumatic ejector type suitable for use in particular to sow light seeds such as vegetable seeds.

According to the invention, a distributor member with an apertured disk releases the seeds within a venturi neck or slightly downstream of said neck, i.e. at a location where the gas flow in the venturi has its greatest velocity and therefore carries the seeds in the most reliable manner.

More precisely, the invention relates to a seeding machine of the pneumatic ejection type especially intended for sowing light seeds such as vegetable seeds, the seeding machine being of the type including a distributor member intended to carry the seeds, means for freeing the seeds from said member in a releasing zone, and means for ejecting seeds, the combination according to the invention being such that the distributor member includes an apertured disk intended to rotate past a suction chamber which is located on one side of the disk and is interrupted in the releasing zone and means for ejecting include a venturi which is directed towards the ground is juxtaposed to the other side of said apertured disk and has a convergent section connected to a source of compressed fluid, a neck having an inlet port for the seeds carried and held by the disk, and a divergent section, said port provided in the neck or close to the latter lying in the releasing zone or close to said zone, the venturi neck being moreover so disposed with respect to the suction chamber that the seeds, when released by the apertured disk, are already substantially located in the venturi neck or downstream of said neck.

In an advantageous embodiment, the venturi divergent section is longitudinally divided into several portions each prolonged by a duct, and the apertured disk includes several circular rows of apertures arranged in such manner that the seeds form the individual rows are released in different portions of the divergent section. The duct ends remote from the venturi neck are advantageously staggered in the direction transverse to the plane of the apertured disk, i.e. transverse to the direction of travel of the seeding machine.

In a specific embodiment, the seeding machine moreover includes a device for adjusting the skew of the venturi with respect to the ground. This device advantageously effects skew adjustment by rotating the suction chamber and the venturi about the rotation axis of the apertured disk. This skew adjustment is preferably effected as a function of the seeding machine velocity so that the resultant vector of the machine velocity and of the velocity of the seeds propelled by the venturi be perpendicular to the ground.

It is advantageous to have a device allowing adjustment of the compressed fluid pressure. Preferably the same device is used as the source of compressed fluid required for the venturi and as the vacuum source for operating the suction chamber.

The invention will now be described in more details with reference to specific embodiments disclosed by way of non restrictive example and shown on the accompanying drawings, wherein:

BRIEF DESCRIPTION OF THE DRAWINGS

FIG. 1 is a longitudinal diagrammatical view of ejecting means according to the invention as mounted on a pneumatic seeding machine of the apertured disk type;

FIG. 2 is a longitudinal sectional view of means of FIG. 1, along line II—II;

FIG. 3 is a diagrammatical longitudinal sectional view of ejecting means according to another embodiment of the invention, provided on a pneumatic seeding machine of the apertured disk type;

FIG. 4 is a longitudinal sectional view of double ejecting means according to the invention, as mounted on a seeding machine of the apertured disk type; and FIG. 5 is a longitudinal sectional view of ejecting means of FIG. 4, along line V—V.

DETAILED DESCRIPTION OF THE PREFERRED EMBODIMENTS

The description to follow relates to a pneumatic seeding machine having a seed distributor consisting of a substantially vertical rotary apertured disk adjacent to a suction chamber which is interrupted in a seed releasing zone preferably located below the level of the axis of rotation of the disk. This kind of single-seed pneumatic seeding machine of the disk type is described in more details, in particular, in French Pat. Nos. 1,208,202; 1,410,390 and 1,585,445.

As shown in FIGS. 1 and 2, the pneumatic ejecting means according to the invention essentially include a venturi 1 attached to one side of an apertured disk 2 of a pneumatic distributor whereof the suction chamber 3, located behind the disk, is interrupted in the seed releasing zone. As shown in dashed lines in FIG. 1, suction chamber 3 includes an end wall 4 which extends radially across the circular path of travel of the suction apertures 6 in disk 2, substantially in line with the neck 7 of the venturi attached to the other side of the disk.

The seed releasing zone lies from the location where the end wall 4 of suction chamber 3 intersects the path of travel 5 of apertures 6 which, beyond said location, no more move past a zone under negative pressure, but in a zone under atmospheric pressure, this of course causing removal of the suction and release of the seeds. In said releasing zone, from the line with end 4 of suction chamber 3, the neck 7 of the venturi 1 has in its wall an inlet port 8 straddling the path of travel 5 of said apertures 6 for transporting the seeds 9, so that said seeds carried by distributor disk 2 can move into venturi 1, which is juxtaposed to the side of disk 2 supporting said seeds.

Of course, the venturi includes, in a manner known per se, a convergent section 10 extended into a divergent section 11, said convergent section 10 being connected by a duct 12 (see FIG. 2) to a source of compressed fluid not shown. In particular, convergent section 10 can be fed with the air which is exhausted from suction chamber 3 to hold the interior thereof under negative pressure.

As may be seen in FIGS. 1 and 2, the upper half of venturi 1 has no rear fixed wall and is open opposite to distributor disk 2 which constitutes a rear wall for convergent section 10, for the area of neck 7 where the seed inlet 8 lies and for the upper portion of divergent section 11, which has its lower portion closed to the rear by a fixed wall 13.

The whole of the distributor (suction chamber and venturi) is adapted to tilt about the rotation axis of disk 2.

In this manner, the skew of the venturi with respect to the ground can be changed at will.

As shown in FIG. 1, venturi 1 is positioned across the circular path of travel 5 of the seeds with its convergent section lying inside the circular array of apertures 6 and its divergent section lying outside the latter, the intersection with the seed path lying substantially at neck 7, and said seed inlet port 8 opening on the side opposite to the disk axis.

In another embodiment shown in FIG. 3, the ejection venturi 21 according to the invention lies in substantially tangential relation to said path of travel 5 of the apertures in distributor disk 2, in such manner that both divergent section 22 an convergent section 23 of the venturi lie outside said circular path 5 of the seeds. The point of tangency between the venturi axis and the seed path 5 is located slightly downstream of the venturi neck 24, at the root of divergent section 22, and a seed inlet port 25 opens on the side of the axis of disk 2, substantially astride the path of the transported seeds 9. As previously, neck 24 of the venturi and opening 25 are located in the seed releasing zone, i.e. substantially in line with the end wall 4 of the distributor suction chamber said wall being shown in dashed line on FIG. 3. Convergent section 23 of venturi 21 is fed with compressed air through a duct 26 in axial alignment with the venturi wherefrom it extends upwards, the absence of a bend at the convergent section inlet acting to reduce pressure drop. The upper half of divergent section 22 as well as the lower portion of convergent section 23 have no fixed rear wall and are open in front of distributor disk 2, the latter acting as a movable rear wall.

The operation of the above described seeding machines with pneumatic ejecting means is as follows.

During operation, the apertured distributor discs rotate in the counterclockwise direction as suggested by arrows A and B in FIGS. 1 and 3, and the convergent sections 10 and 23 of venturis 1 and 21 respectively are fed with compressed air flowing as diagrammatically shown by arrows on the figures. The compressed air flows are accelerated at venturi necks 7 and 24 and attain an extremely high velocity at the inlet ports 8 and 25 for the seeds 9 carried by distributor disk 2. Since the suction chamber of the distributor is interrupted at the neck or slightly downstream thereof, the seeds are released from the carrier disk and literally seized by the high velocity compressed air flow issuing from the venturi convergent sections, added with the air sucked in through inlet ports 8 and 25 of the venturis. The seeds are thus propelled in divergent sections 11 and 22 towards the ground.

Since the seeding machine moves with respect to the ground, the seeds emerging from the venturis are subjected to the action of a horizontal velocity component W which combines with the action of a veocity component V directed along the venturi axis. Thus, by controlling the pressure of the compressed air introduced in the convergent sections of the venturis, or the skew of the latter with respect to the vertical, or both of these factors, the resultant velocity component Vo can be made substantially perpendicular to the ground, so that the seed ejected is directed perpendicularly to the soil of the furrow and is not liable to rebound or roll.

FIGS. 4 and 5 show an embodiment of a seeding machine according to the invention wherein the venturi is of the double type.

More precisely, the seeding machine includes an apertured disk 27 having two circular rows of apertures 28 and 29, located in front of a suction chamber, so that seeds 30 can be retained against the disk. The suction chamber, not shown, extends up to the axis designated by reference 31.

The venturi is supplied with compressed air through an inlet duct 32 and includes a convergent section 33, a neck 34 and a divergent section 35.

In this embodiment, the divergent section 35 is longitudinally divided into two portions by a partition 36 which thus defines two flow channels in the divergent section. These two flow channels are extended into ducts 37 and 38, more clearly shown in FIG. 5.

Figure 2:
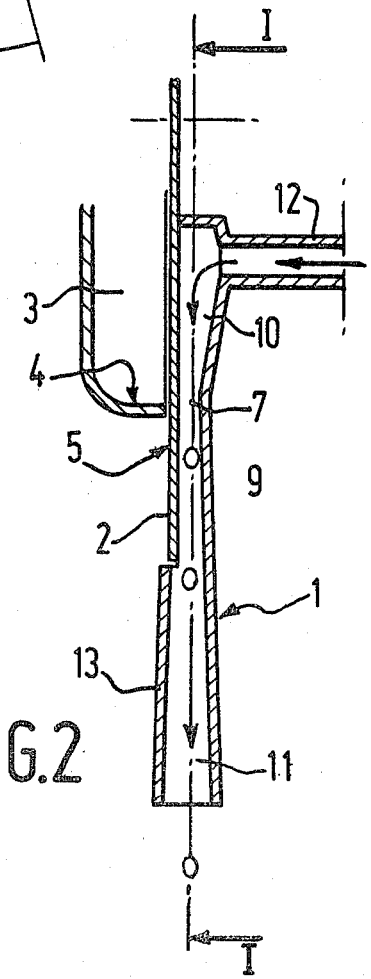
Figure 3:
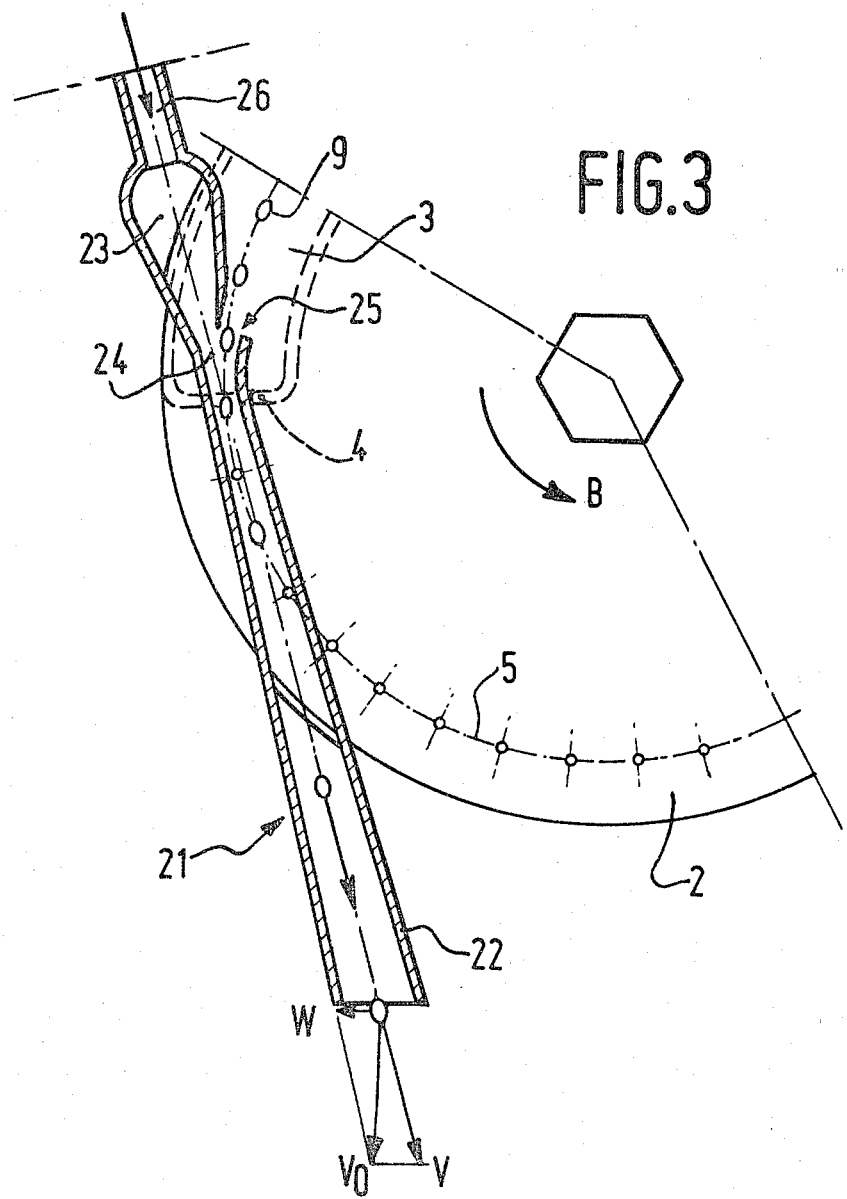

The other features are similar to those of the seeding machines previously described with reference to FIGS. 1 to 3.

During operation, either aperture row 28, 29 brings seeds to the inlet of a respective channel of divergent section 35, so that the seeds are released when having already entered either channel or just before entering the same. In this manner, the seeding machine allows, with one single apertured disk, sowing into two parallel furrows.

Of course, while the above-described disc includes but two parallel rows, the number of rows used may be greater. Thus, a single apertured disk can distribute seeds to be set in several parallel furrows.

As may be ascertained form the description given above, the pneumatic ejecting means according to the invention allows sowing of light seeds due to the fact that said seeds are literally sucked into ejecting means and propelled by the compressed air flowing through the latter. The negative pressure area created at the venturi necks avoids formation of an outwardly directed leakage air flow which could prevent the seeds from entering ejecting means.

It will be understood that the scope of the invention is not limited to the sole embodiment described above by way of non restrictive example, but extends to every modified embodiment only differing therefrom by constructional details.

Moreover, the use of ejection venturis according to the invention is not limited to pneumatic seeding machines of the apertured disk type, but can of course be extended to any other type of seeding machine, and especially to mechanical seeding machines equipped with distributors of the socket type.

What we claim is:

1. A seeding machine of the pneumatic ejecting type, especially intended for sowing light seeds such as vegetable seeds, said seeding machine including an apertured distributor disk (2) for carrying seeds, adapted to rotate in front of a suction chamber (3) located on one side of said disk (2) and interrupted in a releasing zone, and an ejection venturi (1) directed towards the ground and juxtaposed to the other side of said distributor disk (2), the convergent section of said venturi being connected to a source of compressed fluid, the neck (7) of said venturi having an inlet port (8) for the seeds carried and held by said distributor disk (2), said port (8) being located in said releasing zone, and the venturi neck (7) is so disposed with respect to said suction chamber (3) that, when said seeds are released from said distributor disk (2) they already lie substantially in the venturi neck (7).

2. A seeding machine according to claim 1, characterized in that the divergent section (35) of said venturi is longitudinally divided into several portions which define corresponding flow channels, the flow channels being extended by ducts, (37, 38), and said apertured disk includes several circular rows of apertures (28, 29), said rows being so arranged that the seeds of the individual rows are released in different portions of said divergent section.

3. A seeding machine according to claim 2, characterized in that those ends of said ducts (37, 38) remote from said venturi neck are staggered in a direction perpendicular to the plane of the apertured disk.

4. A seeding machine according to claim 1 characterized in that said venturi is positionable at various angles to the ground.

5. A seeding machine according to claim 4 characterized in that said suction chamber (3) and said venturi (1) are rotatable about the axis of rotation of said disk (2).

6. A seeding machine according to either claim 4 or 5 characterized in that said venturi is positionable as a function of the seeding machine velocity so that the resultant vector of the seeding machine velocity and of the velocity of seeds propelled by the venturi is perpendicular to the ground.

7. A seeding machine according to claim 1 characterized in that the fluid pressure produced by said source of compressed fluid is adjustable.

8. A seeding machine according to claim 1, characterized in that said source of compressed fluid for the venturi also serves as a vacuum source for operating said suction chamber (3).

* * * * *